(12) United States Patent
Espinoza et al.

(10) Patent No.: US 7,012,103 B2
(45) Date of Patent: Mar. 14, 2006

(54) COMMERCIAL FISCHER-TROPSCH REACTOR

(75) Inventors: Rafael L. Espinoza, Ponca City, OK (US); Jianping Zhang, Ponca City, OK (US); Harold A. Wright, Ponca City, OK (US); Todd H. Harkins, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 255 days.

(21) Appl. No.: 10/395,912

(22) Filed: Mar. 24, 2003

(65) Prior Publication Data
US 2004/0192989 A1 Sep. 30, 2004

(51) Int. Cl.
*C07C 27/00* (2006.01)

(52) U.S. Cl. .................. 518/706; 711/712; 711/715

(58) Field of Classification Search .................. 518/706, 518/711, 712, 715
See application file for complete search history.

(56) References Cited

U.S. PATENT DOCUMENTS

| | | | |
|---|---|---|---|
| 2,248,734 A | 7/1941 | Barr | |
| 2,255,126 A | 9/1941 | Myddleton | |
| 2,353,600 A | 7/1944 | Sweetser | |
| 2,475,025 A | 7/1949 | Huff | |
| 2,662,911 A | 12/1953 | Dorschner et al. | |
| 2,740,803 A | 4/1956 | Dorschner | |
| 4,199,523 A | 4/1980 | Rottig | 260/449.6 |
| 4,423,156 A | 12/1983 | Büssemeier et al. | |
| 4,496,666 A | 1/1985 | Pesa et al. | |
| 4,547,525 A | 10/1985 | Kim | |
| 4,626,552 A | 12/1986 | Arcuri | |
| 5,118,715 A | 6/1992 | Iglesia et al. | |
| 5,286,455 A | 2/1994 | Eilers et al. | |
| 6,156,809 A | 12/2000 | Clark et al. | 518/719 |
| 6,313,361 B1 | 11/2001 | Waycuilis | |
| 2001/0021724 A1 | 9/2001 | Arcuri et al. | |

FOREIGN PATENT DOCUMENTS

| | | |
|---|---|---|
| GB | 1 490 494 | 11/1977 |
| GB | 2 089 674 | 10/1981 |

OTHER PUBLICATIONS

PCT International Search Report for International Application No. PCT/US04/08936 dated Jan. 9, 2005 (2 p.).

(Continued)

*Primary Examiner*—J. Parsa
(74) *Attorney, Agent, or Firm*—Conley Rose P.C.

(57) ABSTRACT

A process for producing hydrocarbons comprises providing a multi-tubular reactor having at least 100 tubes units containing a catalyst, each tube being between 2 and 5 meters tall and in thermal contact with a cooling fluid; feeding hydrogen and carbon monoxide to each tube at a linear gas superficial velocity less than about 60 cm/s; and converting the gas feedstream to hydrocarbons on the catalyst, wherein the yield of hydrocarbons in each tube is greater than 100 (kg hydrocarbons)/hr/(m³ reaction zone). Each tube may have an internal diameter greater than 2 centimeters. The catalyst may be active for Fischer Tropsch synthesis and may comprise cobalt or iron. The maximum difference in the radially-averaged temperature between two points that are axially spaced along the reactor is less than 15° C., preferably less than 10° C. The catalyst loading or intrinsic activity may vary along the length of the reactor.

26 Claims, 4 Drawing Sheets

OTHER PUBLICATIONS

Eilers et al., *The Shell Middle Distillate Synthesis Process (SMDS);* Catalysis Letters 7 (1990) 253-270.

Dry, *The Fischer-Tropsch Prcess—Commercial Aspects;* (1990) pp. 183-206.

Jager et al., *Advances in Low Temperature Fischer-Tropsch Synthesis;* Catalysis Today 23 (1995) 17-28.

Sie; *Process Development and Scale Up: IV. Case History of the Development of a Fischer-Tropsch Synthesis Process;* REV. Chem. Eng. (1998), 14(2), pp. 109-157.

Letzel et al.; *Gas Holdup and Mass Transfer in Bubble Column Reactors Operated at Elevated Pressure;* Chemical Engineering Science 54 (1999) 2237-2246.

Espinoza et al., *Low Temperature Fischer-Tropsch Synthesis from a Sasol Perspective;* Applied Catalysis A: General 186 (1999) 13-26.

Maretto et al., *Modelling of a Bubble Column Slurry Reactor for Fischer-Tropsch Synthesis;* Catalysis Today 52 (1999) 279-289.

Jager et al., *Advances in low temperature Fischer-Tropsch Synthesis,* Catalysis Today 23 (1995) pp. 17-28.

Krishna et al., *Design and scale-up of the Fischer0Tropsch bubble column slurry reactor,* Fuel Processing Technology 64 (2000) pp. 73-105.

Sie, *Process Development and Scale up:IV. Case History of the Development of a Fischer-Tropsch Synthesis Process,* Rev. Chem. Eng (1998)m 14(2), pp. 109-157.

COMMERCIAL FISCHER-TROPSCH REACTOR

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD OF THE INVENTION

Natural gas, found in deposits in the earth, is an abundant energy resource. For example, natural gas commonly serves as a fuel for heating, cooking, and power generation, among other things. The process of obtaining natural gas from an earth formation typically includes drilling a well into the formation. Wells that provide natural gas are often remote from locations with a demand for the consumption of the natural gas.

Thus, natural gas is conventionally transported large distances from the wellhead to commercial destinations in pipelines. This transportation presents technological challenges due in part to the large volume occupied by a gas. Because the volume of a gas is so much greater than the volume of a liquid containing the same number of gas molecules, the process of transporting natural gas typically includes chilling and/or pressurizing the natural gas in order to liquefy it. However, this contributes to the final cost of the natural gas and is not economical Further, naturally occurring sources of crude oil used for liquid fuels such as gasoline and middle distillates have been decreasing and supplies are not expected to meet demand in the coming years. Middle distillates typically include heating oil, jet fuel, diesel fuel, and kerosene. Fuels that are liquid under standard atmospheric conditions have the advantage that in addition to their value, they can be transported more easily in a pipeline than natural gas, since they do not require energy, equipment, and expense required for liquefaction.

Thus, for all of the above-described reasons, there has been interest in developing technologies for converting natural gas to more readily transportable liquid fuels, i.e. to fuels that are liquid at standard temperatures and pressures. One method for converting natural gas to liquid fuels involves two sequential chemical transformations. In the first transformation, natural gas or methane, the major chemical component of natural gas, is reacted with oxygen to form syngas, which is a combination of carbon monoxide gas and hydrogen gas. In the second transformation, known as the Fischer-Tropsch process, carbon monoxide and hydrogen are converted into a mixture of organic molecules containing carbon and hydrogen. Those organic molecules containing only carbon and hydrogen are known as hydrocarbons. In addition, other organic molecules containing oxygen in addition to carbon and hydrogen known as oxygenates may be formed during the Fischer-Tropsch process. Hydrocarbons having carbons linked in a straight chain are known as aliphatic hydrocarbons that may include paraffins and/or olefins. Paraffins are particularly desirable as the basis of synthetic diesel fuel.

The Fischer-Tropsch product stream typically contains hydrocarbons having a range of numbers of carbon atoms, and thus having a range of molecular weights. Thus, the Fischer-Tropsch products produced by conversion of natural gas commonly contain a range of hydrocarbons including gases, liquids and waxes. Depending on the molecular weight product distribution, different Fischer-Tropsch product mixtures are ideally suited to different uses. For example, Fischer-Tropsch product mixtures containing liquids may be processed to yield gasoline, as well as heavier middle distillates. Hydrocarbon waxes may be subjected to additional processing steps for conversion to liquid and/or gaseous hydrocarbons. Thus, in the production of a Fischer-Tropsch product stream for processing to a fuel it is desirable obtain primarily hydrocarbons that are liquids and waxes (e.g. $C_{5+}$ hydrocarbons).

Various metals, including but not limited to iron, cobalt, nickel, and ruthenium, alone and in conjunction with other metals, can serve as Fischer-Tropsch catalysts. Cobalt is particularly useful as a catalyst for converting natural gas to heavy hydrocarbons suitable for the production of diesel fuel. Iron has the advantage of being readily available and relatively inexpensive but also has the disadvantage of greater water-gas shift activity. Ruthenium is highly active but quite expensive. Consequently, although ruthenium is not the economically preferred catalyst for commercial Fischer-Tropsch production, it is often used in low concentrations as a promoter with one of the other catalytic metals.

Various types of reactors have been used to carry out Fischer Tropsch reactions, including packed bed (also termed fixed bed) reactors and gas-agitated multiphase reactors. Originally, the Fischer-Tropsch synthesis was carried out in packed bed reactors. Gas-agitated multiphase reactors, sometimes called "slurry reactors" or "slurry bubble columns," gained favor, however, because the circulation of the slurry makes it much easier to control the reaction temperature in a slurry bed reactor than in a fixed bed reactor. Gas-agitated multiphase reactors operate by suspending catalytic particles in a liquid and feeding gas reactants into the bottom of the reactor through a gas distributor, which produces small gas bubbles. As the gas bubbles rise through the reactor, the reactants are absorbed into the liquid and diffuse to the catalyst particles where, depending on the catalyst system, they are typically converted to gaseous and liquid products. The gaseous products formed enter the gas bubbles and are collected at the top of the reactor. Liquid products are recovered from the suspending liquid using different techniques, including filtration, settling, hydrocyclones, magnetic techniques, etc. Sie and Krishna (Applied Catalysis A: General 1999, 186, p. 55), incorporated herein by reference in its entirety, give a history of the development of various Fischer Tropsch reactors.

Because the Fischer Tropsch reaction is exothermic, temperature control is an important aspect of Fischer Tropsch reactor operation. Gas-agitated multiphase reactors or slurry bubble column reactors (SBCRs) have very high heat transfer rates and therefore allow good thermal control of the reaction. On the other hand, because the desired liquid products are mixed with the suspending liquid, recovery of the liquid products can be relatively difficult. This difficulty is compounded by the tendency of the catalyst particles to erode in the slurry, forming fine catalyst particles that are also relatively difficult to separate from the liquid products. Fixed bed reactors avoid the problems of liquid separation and catalyst separation, but do not provide the mixing of phases that allows good thermal control in slurry bubble column reactors.

Furthermore, Fischer Tropsch reactors are typically sized to achieve a desired volume of production. When a fixed bed reactor is planned, economies of scale tend to result in the use of long (tall) reactors. Because the Fischer Tropsch reaction is exothermic, however, a thermal gradient tends to form along the length of the reactor, with the temperature increasing with distance from the reactor inlet. In addition, for most Fischer Tropsch catalyst systems each ten degree rise in temperature increases the reaction rate approximately 60%, which in turn results in the generation of still more heat. To absorb the heat generated by the reaction and offset the rise in temperature, a cooling liquid is typically circulated through the reactor. Thus, for a given reactor system having a known amount of catalyst with a certain specific activity and known coolant temperature, the maximum flow rate of reactants through the reactor is limited by the need to maintain the catalyst below a predetermined maximum catalyst temperature at all points along the length of the catalyst bed and the need to avoid thermal runaway which can result in catalyst deactivation and possible damage to the physical integrity of the reactor system. The net result is that it is unavoidable to operate most of the reactor at temperatures below the maximum temperature, with the corresponding low volumetric productivities over most of the reactor volume.

Prior art systems constrained by these considerations typically achieve less than optimal results. In particular, conventional systems typically fail to achieve maximum productivity for a given reactor volume.

As used herein the term "volume productivity" is defined as the total conversion for the reactor divided by the volume of the reaction zone. Because large Fischer Tropsch systems are relatively expensive to construct and because the cost of construction is a function of reactor volume and complexity, it is desired to provide a system that achieves improved efficiency over prior art systems while avoiding the difficulties of the prior art. In particular, it is desired to provide a Fischer Tropsch reactor system that avoids the problems of catalyst attrition and liquid separation and yet also provides good temperature control and high overall conversion and volume productivity without requiring excessive equipment complexity.

SUMMARY OF THE INVENTION

The present invention provides improved efficiency over prior art systems and avoids the difficulties of the prior art. In particular, the present system provides a fixed-bed Fischer Tropsch reactor system that achieves high overall conversion and volume productivity through the optimization of several parameters, including inlet temperatures, coolant temperature, length of catalyst bed, and heat transfer area and coefficient. The present system also includes an embodiment in which the catalyst loading is varied along the length of the reactor so as to further optimize reactor operation.

The method and system of the present invention make it possible to produce paraffins very cost effectively, using a relatively short reactor. The present system can be operated at low temperatures, no recycle or low recycle ratios, and low gas linear velocities, and yet gives an exceptionally high volume productivity.

The present system can be embodied in a method or in an apparatus. In one preferred embodiment, the invention comprises a process for the production of hydrocarbons, comprising a) providing a multi-tubular reactor comprising at least 100 tubular units containing a catalyst in a reaction zone, each tubular unit having a height between 2 and 5 meters and being in thermal contact with a cooling fluid; b) feeding a feedstream comprising hydrogen and carbon monoxide to each tubular unit at a linear gas superficial velocity less than about 60 cm/s; and c) converting the gas feedstream to hydrocarbons on the catalyst. Each tube may have an internal diameter greater than 2 centimeters.

In another preferred embodiment, a system for converting syngas to hydrocarbons, comprises a reactor including a fixed catalyst bed defining a reaction zone, a reactant inlet, a product outlet, and a cooling system in thermal contact with the catalyst bed. The catalyst bed is preferably less than about 5 meters long and the superficial velocity in the catalyst bed is preferably less than 60 cm/s.

The catalyst may be active for Fischer Tropsch synthesis, e.g. cobalt or iron. The catalyst may be loaded into the reactor such that the catalyst loading or the catalyst intrinsic activity may vary along the length of the reactor. If the catalyst is cobalt, the maximum difference in the radially-averaged temperature between two points that are axially spaced along the reactor is preferably less than 15° C. and may be less than 10° C. If the catalyst is iron, the maximum difference in the radially-averaged temperature between two points that are axially spaced along the reactor is preferably less than 15° C. and may be less than 10° C.

The present process can be used to produce $C_{5+}$ hydrocarbons. The yield of hydrocarbons in each tubular unit is preferably greater than 100 (kg hydrocarbons)/hr/(m³ reaction zone), and more preferably greater than 150 (kg hydrocarbons)/hr/(m³ reaction zone). In preferred embodiments the system is operated with less than 10% recycled material.

If desired, the feed stream can be intermittently replaced with a stream comprising hydrogen for a period between 0.5 to 24 hours, and running at a temperature between 150° and 300° C., a total inlet pressure between 2 bar to 35 bar, and a linear velocity range from 2 to 60 centimeters per second so as to regenerate the catalyst.

BRIEF DESCRIPTION OF THE DRAWINGS

For a more detailed understanding of the invention, reference will be made to the accompanying Figures, wherein.

DETAILED DESCRIPTION OF THE PREFERRED EMBODIMENTS

Figure 1:
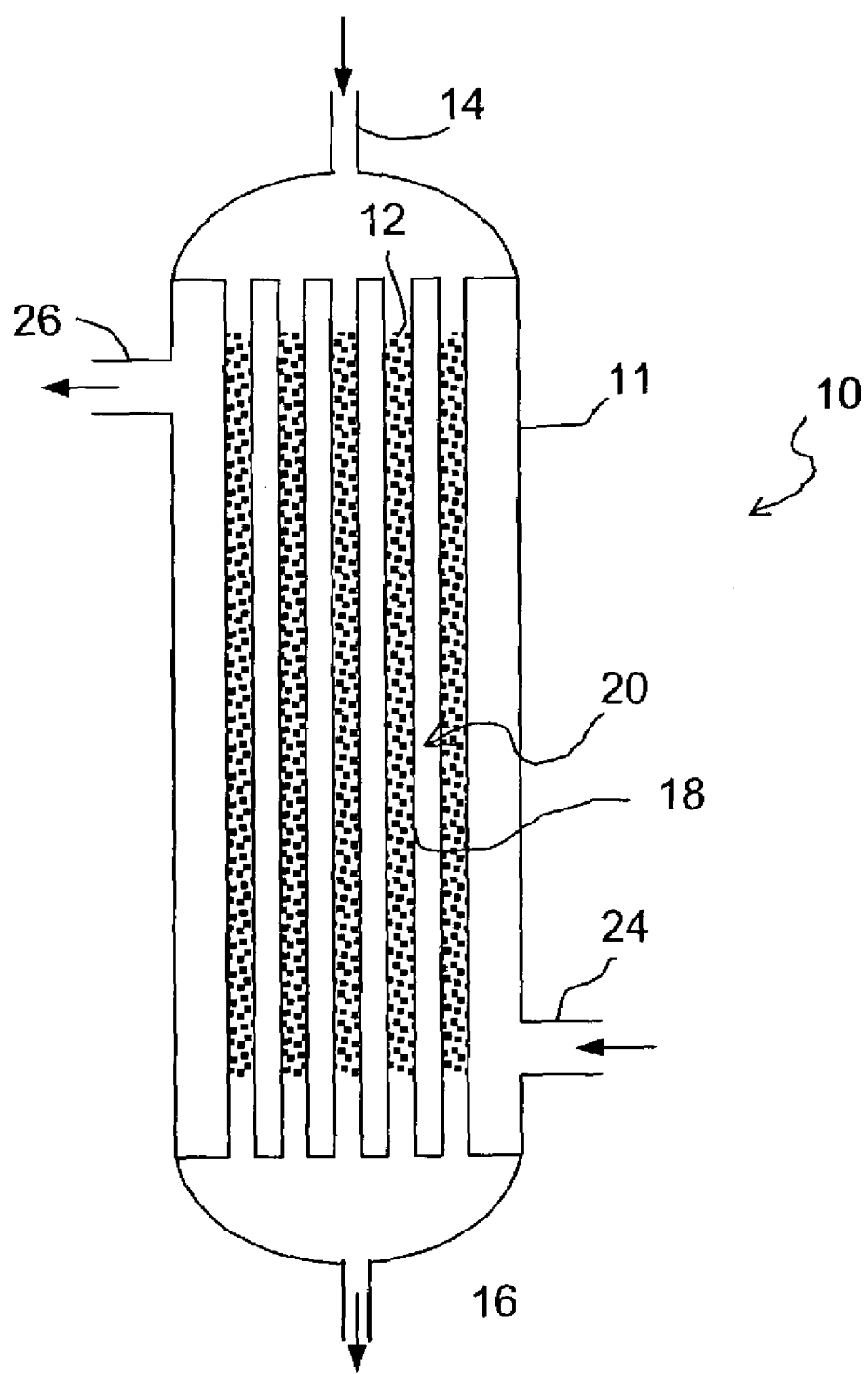
FIG. 1 is a schematic diagram of a fixed-bed Fischer Tropsch reactor.

Referring initially to FIG. 1, a tubular fixed bed Fischer Tropsch reactor 10 comprises a reactor housing 11, in which is supported a fixed catalyst bed 12. Housing 10 includes a feed gas inlet 14 and a product outlet 16. Between inlet 14 and outlet 16 fluid flows through a plurality of tubular units 18, each of which contains catalyst. In one preferred embodiment, reactor 10 includes at least 100 tubular units and each tubular unit has an internal diameter greater than 2 centimeters and a height between 2 and 5 meters.

A cooling system 20 is in close thermal contact with catalyst bed 12. In a preferred embodiment, tubular units 18 pass through cooling system 20. In cooling system 20 tubular units 18 are surrounded by a cooling fluid, which is contained by reactor housing 11. Cooling system 20 has a coolant inlet 24 and a coolant outlet 26. The coolant 26 can be water or any other suitable fluid. Thermal contact between the cooling system 20 and the catalyst bed 12 is preferably achieved by providing this shell and tube arrangement, with the reaction occurring inside a plurality of tubes and the coolant outside the tubes, but any other suitable configuration such as are known in the art would suffice.

In a conventional reactor of this type, the reactant gases are fed into the top, of the reactor and flow into tubular units 18. Upon contacting the catalyst, some of the feed gas is converted into liquid products. The liquid products, gas products and unreacted feed exit the bottom of reactor 10 via outlet 16. The feed gases are at an inlet temperature $T_{in}$ when they enter reactor 10. Likewise, the coolant is fed into the reactor at a predetermined coolant temperature $T_c$.

The rate of reaction, and thus the rate of heat generation, at each point in catalyst bed 12 depends on the temperature and pressure at that point, on the gas and liquid composition at that point, on the catalyst intrinsic activity and selectivity, and on the feed rate of the reactants. The equations for calculating the heat generated by the reaction, the heat absorbed by the coolant, and the reaction rate as a function of catalyst type (e.g. iron or cobalt based Fischer-Tropsch catalysts), load, and temperature are well known in the art. It should be understood than whenever catalyst load or catalyst concentration is mentioned herein, it is also equivalent to catalyst intrinsic activity. That is, a catalyst may be diluted with inert material to lower the overall catalyst activity per reactor volume or the catalyst may be undiluted but its intrinsic activity increased or decreased, such as by varying the catalyst loading, thereby achieving a similar effect. Thus, the system can be modeled, allowing calculation of the temperature at each point along the length of the reactor and the overall conversion for the reactor. The overall productivity is the integral of the productivity along the length of the reactor.

Figure 2A:
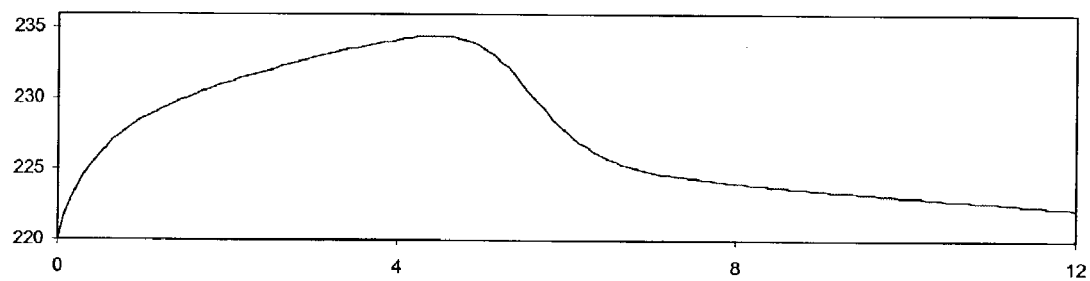
FIGS. 2A–B are plots showing the temperature in a Fischer Tropsch reactor as a function of distance along the reactor for iron and cobalt systems, respectively.
Figure 2B:
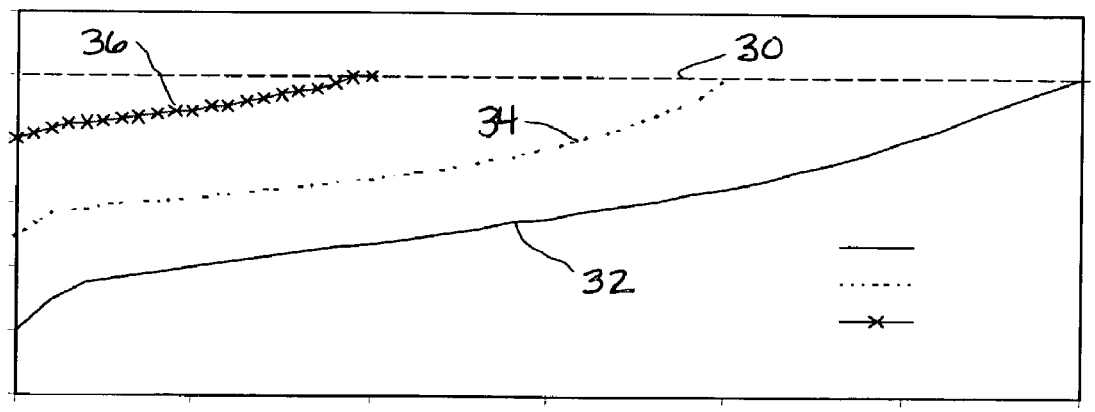

FIGS. 2A–2B are hypothetical exemplary plots showing the temperature at each point along the length of a conventional reactor for iron and cobalt catalysts, respectively. With the iron catalyst (FIG. 2A), it can be seen that the temperature rises briefly and then declines quickly until it approaches the coolant temperature. Because productivity is a function of temperature, the downstream, or right-hand as drawn, half of the reactor is much less productive than the upstream half. This discrepancy greatly reduces the volume productivity of the reactor as a whole.

In contrast, with a cobalt catalyst (FIG. 2B), the temperature rises steadily along the length of the reactor. As mentioned above, each catalyst system will have a preferred maximum temperature below which it is preferred to operate. The preferred maximum temperature is determined by the desire to avoid an increase in catalyst deactivation rate, an increase in methanation rate, and/or thermal runaway. Because each catalyst system has a maximum temperature, which is 235° C. for the system illustrated in FIG. 2B shown by dashed line 30, the inlet temperature must be low enough to ensure that the maximum temperature is not exceeded at the downstream end of the reactor. As illustrated by the solid line 32 in FIG. 2B, in a long reactor the rise in temperature is so great that the inlet temperature must be well below the preferred maximum temperature. As with the iron catalyst, this results in a system that is forced to operate well below its maximum productivity.

The inventors have discovered that the volume productivity of a Fischer Tropsch reactor system can be increased by using a shortened reactor, maximizing catalyst loading and optimizing operating conditions. In particular, for a reactor height less than five meters, volume productivity can be increased by setting $T_{in}$ to a value close to $T_c$ and using the greatest catalyst loading that would not result in thermal runaway.

For example, referring to lines 34, 36 in FIG. 2B, the inlet temperature in a shorter reactor, such as an 8- or 4-meter reactor, can be much higher. As illustrated in FIG. 2-B, a shorter reactor allows for a higher inlet temperature while not exceeding the same maximum temperature as the case for a longer reactor running with a lower inlet temperature. A higher inlet temperature results in a much more efficient reactor and higher volume productivity, as more of the reaction takes place closer to the preferred maximum temperature. The optimal catalyst load for the new system may be determined using an iterative modeling approach.

Figure 3A:
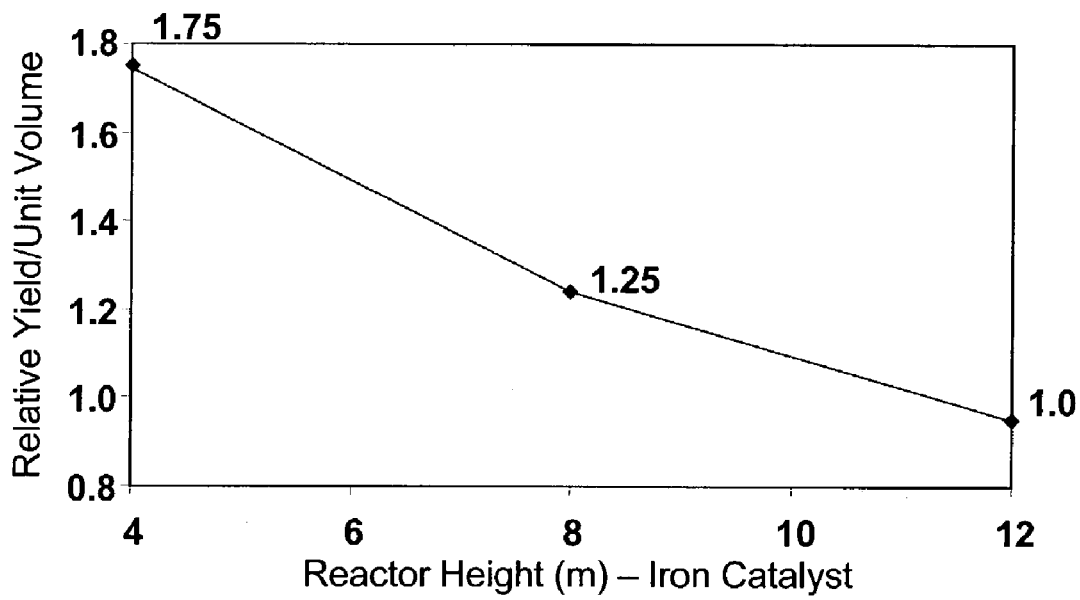
FIGS. 3A–B is a plot showing relative yield per unit volume as a function of reactor height for hypothetical iron- and cobalt-based Fischer Tropsch reactors, respectively.
Figure 3B:
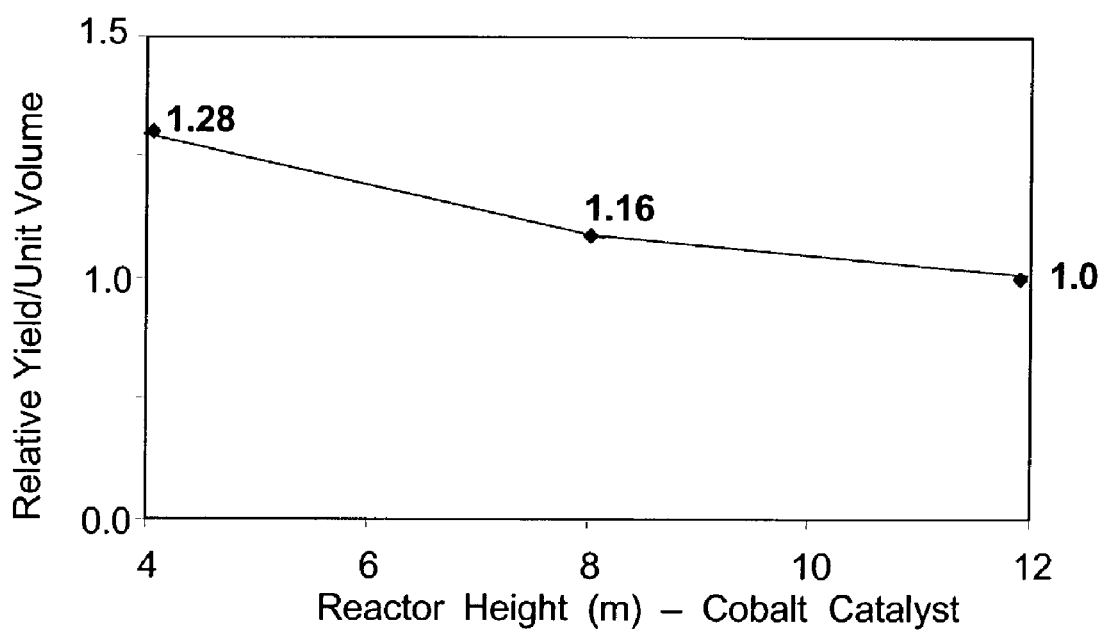

FIGS. 3A–B illustrate hypothetical plots of yield per unit volume for reactors containing cobalt- or iron-based systems as a function of reactor height and normalized to a conventional 12 m reactor. As indicated in FIG. 3, the volume productivity increases significantly when the reactor is shortened in accordance with the present invention. The specific parameters underlying the plot in FIG. 3 are set out in Example 1 below. For this hypothetical system, the volume productivity increase when a 4-meter reactor was used instead of a 12-meter reactor was 28% for a cobalt-based system and 75% for an iron-based system.

EXAMPLE I

A reactor constructed in accordance with the present invention was modeled using the following parameters:

| | |
|---|---|
| superficial gas velocity: | 22.8 cm/s |
| $H_2$/CO at inlet: | 2 |
| $N_2$ mole fraction at inlet: | 8.3% |
| inlet temperature: | 215° C. |
| cooling side temperature: | 215° C. |
| operating pressure: | 400 psig |
| superficial velocity of circulating liquid: | 0.01 m/s |

Using these parameters, the maximum uniform catalyst loading allowed by the model while still avoiding temperature runaway was 2.4 times the maximum loading allowed for a model of a conventional reactor system operating under the same conditions.

Based on modeling data, it is believed that a Fischer-Tropsch reactor system according to this invention can have a hydrocarbon productivity such that the yield of hydrocarbons in each tube in the reactor is greater than 100 (kg hydrocarbons)/hr/(m3 reaction zone) and more preferably is greater than 150 (kg hydrocarbons)/hr/(m3 reaction zone).

Figure 4:
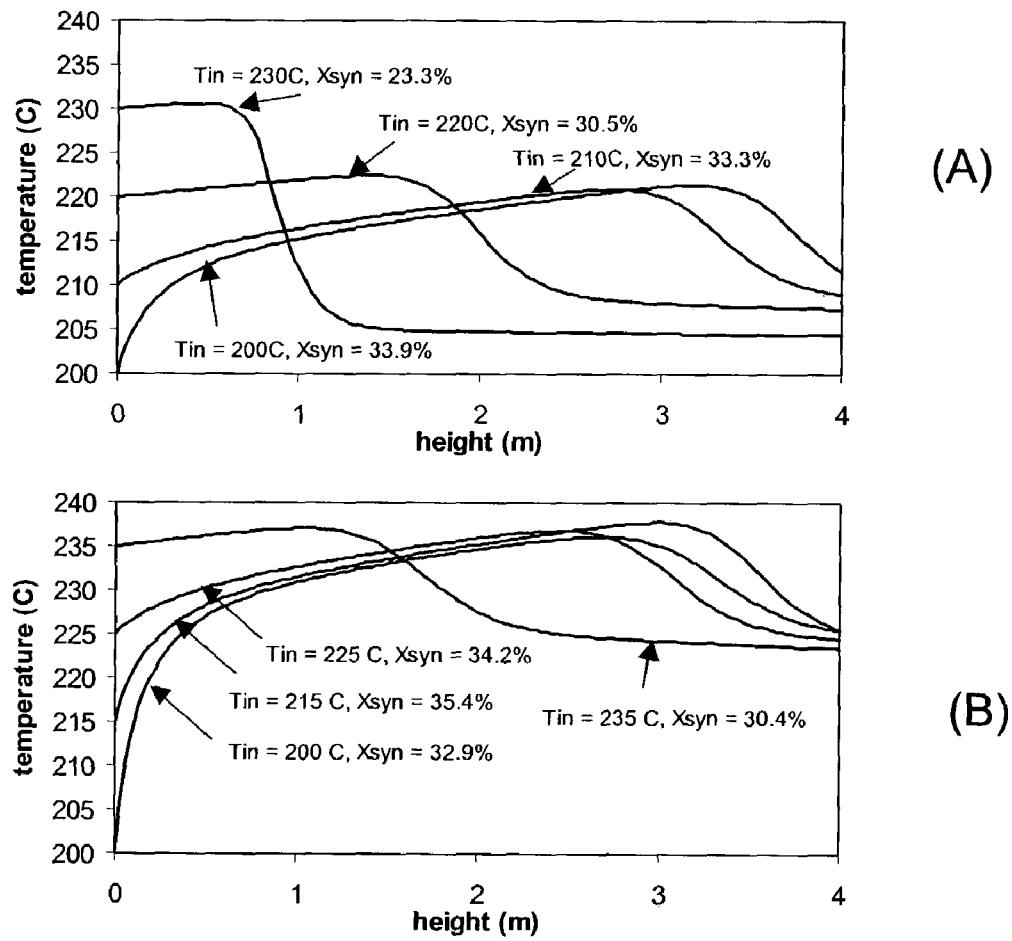
FIGS. 4A–B are plots showing the effect of inlet temperature on overall reactor conversion for cooling temperatures of 200° C. and 215° C., respectively.

As mentioned above, in some instances the optimum reactor performance can be achieved when the inlet temperature is substantially equal to the cooling temperature. Especially for the reactors with diameters between 1 to 2 inches and the superficial gas velocity less than 0.6 m/s. FIGS. 4A and 4B each illustrate, for four different inlet temperatures, the temperature at each point along a hypothetical reactor having the parameters set out above. In FIG. 4A the cooling temperature is 200° C. and in FIG. 4B it is 215° C. FIGS. 4A and 4B also include predicted overall reactor conversion values for each configuration. As can be seen, overall conversion is maximized when the inlet temperature and the cooling temperature are equal. Likewise, overall conversion increases when the cooling temperature is increased from 200° C. to 215° C. Nonetheless, the maximum temperature that can be withstood by the reactor system is limited by catalyst deactivation and an increase in methanation rate and is generally about 230–240° C. Higher temperatures tend to damage the catalyst system and/or cause thermal runaway. Thus, in a system operating under the conditions described in the Example, an optimum coolant temperature is preferably in the range of 180° to 220° C. and more preferably between about 200° and 215° C.

Because of their optimized inlet temperature, reaction rate, cooling temperature and physical dimensions, it is possible to operate the present reactors at a wider range of superficial velocities with little or no recycle, than is conventionally possible. By way of example, in many instances, the present reactors will operate at superficial velocities less than 1 m/s, more preferably less than 50 cm/s and still more preferably less than 30 cm/s.

While the cooling temperature has a significant effect on the reaction rate and overall reactor conversion, it is closely linked to catalyst loading. For a given catalyst load, cooling temperatures above a certain optimal value will result in temperature runaway, while temperatures below the optimal value will result in a reduced reaction rate and thus less than optimum conversion. Hence, for a given reactor system it is preferred to determined an optimum cooling temperature or cooling temperature range through iterative modeling, while maximizing catalyst loading and avoiding temperature runaway and maximum temperature limits.

In some preferred embodiments, the heat transfer coefficient is also optimized. It has been found that for some configurations a 10% increase in the heat transfer coefficient results in a 5% increase in overall reactor conversion. The heat transfer rate (either coefficient or area) can be increased by increasing the number of tubes in the reactor, decreasing the diameter of the tubes, lowering the cooling temperature or by increasing the gas superficial velocity. Notice however, that an increase in the gas superficial velocity in a conventional reactor may easily result in a temperature runaway since due to kinetic considerations well known in the art, a higher gas linear velocity in this reaction system will result in a higher generation of heat of reaction per reactor unit volume. Increasing the heat transfer coefficient generally also increases the reactor equipment cost, however, so the benefit gained should be offset by this consideration when optimizing the heat transfer coefficient.

Figure 5:
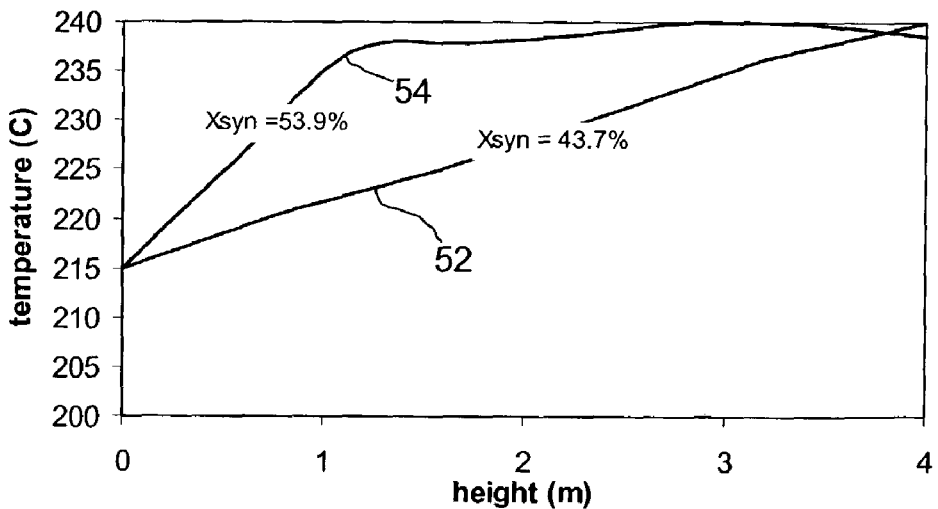
FIG. 5 is a plot showing the temperature as a function of distance along the reactor in a Fischer Tropsch reactor constructed in accordance with a second embodiment of the invention.

According to another preferred embodiment, the reactor configuration is still further optimized by varying the catalyst loading along the catalyst bed. Specifically, the catalyst concentration can be highest at both inlet and outlet ends of the reactor, so that the reaction rate and heat generated are higher in both ends of the reactor. The highest catalyst concentration is preferably no more than 80% greater than the lowest catalyst concentration in the reactor. FIG. 5 shows the results of two reactor systems having variable catalyst weight fractions along the reactor. In a first embodiment, illustrated by line 52, the catalyst concentration is constant along the length of the reactor. In a second embodiment, illustrated by line 54, the catalyst concentration gradually decrease then increases along the reactor height as set out in Table 1 below. At both ends of the reactor catalyst concentration is 50% higher than the lowest catalyst concentration which occurs around the middle reactor. As indicated in FIG. 5, the overall reactor conversion in the first example was 43.7% and in the second example was 53.9%.

TABLE 1

| Reactor Segment | Catalyst Concentration Factors | Catalyst Concentration Factors |
| --- | --- | --- |
| 1 | 1.28 | 1.5 |
| 2 | 1.28 | 1.5 |
| 3 | 1.28 | 1.375 |
| 4 | 1.28 | 1.375 |
| 5 | 1.28 | 1.125 |
| 6 | 1.28 | 1 |
| 7 | 1.28 | 1 |
| 8 | 1.28 | 1 |
| 9 | 1.28 | 1 |
| 10 | 1.28 | 1.125 |
| 11 | 1.28 | 1.1875 |
| 12 | 1.28 | 1.375 |
| 13 | 1.28 | 1.375 |
| 14 | 1.28 | 1.5 |
| 15 | 1.28 | 1.5 |

The reactor of the present invention can be operated under suitable conditions to produce wax with an alpha value of about 0.9. The reactor is preferably operated such that the amount of $C_2$–$C_4$ olefins produced is less than 7% of the total products.

It will be understood that the principles of the present invention can be applied to a plurality of reactors that are arranged either in series or in parallel. If two or more reactors in accordance are used in series, it is preferred to allow the reactants to cool somewhat between stages or to pass between stages without a change in temperature. Increasing the temperature would result in a lower alpha and fewer waxy products. Likewise, because the desired products are waxes, it is preferred to include all of the gas stream leaving the reactor, including light hydrocarbons, in the feed gas to the subsequent reactor.

While recycle of a portion of the product stream to the reactor may be desired, it is not required in the present case. In any event, recycle, if present can be set at any desired fraction of the product stream. The temperature control of the present system is such that the system can be operated cost effectively without recycle and it is preferred, but not necessary, that the system be operated with less than 10 percent recycle in the feedstream. Because recycle is not required, it is preferred to provide sufficient coolant flow to absorb all of the excess heat generated in the reactor.

The present reactors preferably contain any suitable catalyst for promoting the conversion of $H_2$ and CO to hydrocarbons. The FT catalyst includes an active catalyst component unsupported or supported on a support material. The support material (also known as the catalyst support) may be a porous material that provides mechanical support for the active catalyst component. Examples of suitable support materials include boehmite and refractory oxides such as silica, alumina, titania, thoria, zirconia, or mixtures thereof such as silica-alumina. Other examples of suitable support materials are aluminum fluorides and fluorided alumina.

The active catalyst component comprises at least one metal from Groups 8, 9, or 10 of the Periodic Table (based on the new IUPAC notation). Preferably, the active catalyst component is iron, cobalt, nickel, ruthenium, or mixtures thereof. The amount of active catalyst component present may comprise about 1 to 50% by weight of the metal component per total weight of the metal component and support material, preferably from about 5 to 40% by weight, and more preferably from about 10 to 35% by weight. In addition, the FT catalyst may also comprise one or more promoters known to those skilled in the art. Suitable promoters include Group 1 metals, Group 2 metals, Group 3 metals, Group 4 metals, Group 5 metals, Group 7 metals, Group 8 metals, Group 9 metals, Group 10 metals, Group 11, and Group 13 metals. These include the noble metals and boron. Typically, at least a portion of the metal is present in a reduced state (i.e., in the mettallic state). Therefore, the FT catalyst is preferably activated prior to use by a reduction treatment.

Because of the relative short length of the reactor according to our invention, in a preferred embodiment the average diameter of the catalyst particles is equal to or less than 2 mm. Smaller catalyst particles, or catalyst having higher surface area per unit weight are possible in the present invention because the pressure drop across the reactor will not be excessive due to its relatively short length. A higher external surface area catalyst will have a higher effectiveness factor.

It is well known by those skilled in the art that some of the deactivation mechanisms that affect Fischer-Tropsch catalysts include surface condensation, poisoning due to nitrogen containing compounds and oxidation of the active metal due to the partial pressure of water inside the reactor. Some of these deactivation mechanisms like oxidation will occur to a greater extent in this system as compared with conventional technology due to the higher average temperature in the reactor for any given intrinsic activity of the loaded catalyst. This deactivation due to oxidation may be corrected by re-reducing the catalyst in-situ. This can be accomplished by replacing the syngas feed by a stream comprising mainly hydrogen for about 30 minutes to 48 hours operating at temperatures between 150 to 400 degrees centigrade, a pressure between 1 and 45 bars and linear velocities between 1 cm/s to about 60 cm/s.

While the preferred embodiments have been described herein, it will be understood that various aspects of the reactor system could be modified without departing from the scope of the invention. For example, the reactor configuration, catalyst composition, and catalyst support can all be varied. In addition, certain operating parameters, including inlet temperature, superficial velocity, operating pressure, coolant temperature, coolant flow rate and catalyst loading/intrinsic activity axial profiles can all be modified and controlled to achieve the desired results.

What is claimed is:

1. A process for the production of hydrocarbons comprising:
    a) providing a multi-tubular reactor comprising at least 100 tubular units containing a catalyst in a reaction zone, each tubular unit having a height between 2 and 5 meters and being in thermal contact with a cooling fluid;
    b) feeding a gas feedstream comprising hydrogen and carbon monoxide to each tubular unit at a linear gas superficial velocity less than about 60 cm/s; and
    c) converting said gas feedstream to hydrocarbons on said catalyst; wherein the yield of hydrocarbons in each tubular unit is greater than 100 (kg hydrocarbons)/hr/(m$^3$ reaction zone).

2. The process of claim 1 wherein the yield of hydrocarbons in each tubular unit is greater than 150 (kg hydrocarbons)/hr/(m$^3$ reaction zone).

3. The process of claim 1 wherein the linear superficial velocity in the tubular units is less than 30 cm/s.

4. The process of claim 1 wherein each tubular unit tube has an internal diameter greater than 2 centimeters.

5. The process of claim 1 wherein the catalyst is active for Fischer Tropsch synthesis.

6. The process of claim 1 wherein the catalyst comprises cobalt.

7. The process of claim 1 wherein the catalyst comprises iron.

8. The process of claim 1 wherein the catalyst comprises cobalt and the maximum difference in the radially-averaged temperature between two points that are axially spaced along the reactor is less than 15° C.

9. The process of claim 1 wherein the catalyst comprises cobalt and the maximum difference in the radially-averaged temperature between two points that are axially spaced along the reactor is less than 10° C.

10. The process of claim 1 wherein the catalyst comprises iron and the maximum difference in the radially-averaged temperature between two points that are axially spaced along the reactor is less than 15° C.

11. The process of claim 1 wherein the catalyst comprises iron and the maximum difference in the radially-averaged temperature between two points that are axially spaced along the reactor is less than 10° C.

12. The process according to claim 1 wherein the catalyst is loaded into the reactor such that the catalyst loading varies along the length of the reactor.

13. The process according to claim 1 wherein the catalyst intrinsic activity varies along the length of the reactor.

14. The process of claim 1 wherein the hydrocarbons comprise $C_{5+}$ hydrocarbons.

15. The process of claim 1 wherein the feedstream comprises less than 10% recycled material.

16. The process of claim 1, further comprising intermittently replacing the feedstream with a stream comprising hydrogen for a period between 0.5 to 24 hours, and running at a temperature between 150° and 300° C., a total inlet pressure between 2 bar to 35 bar, and a linear velocity range from 2 to 60 centimeters per second.

17. The process according to claim 12 wherein the multi-tubular reactor comprises an inlet end, a middle and an outlet end, and the catalyst loading is highest at the inlet and outlet ends than in the middle.

18. The process according to claim 12 wherein the highest catalyst loading is no more than 80% greater than the lowest catalyst loading in the reactor.

19. The process of claim 1 wherein each tubular unit has a diameter between 1 and 2 inches.

20. The process of claim 1 wherein the multi-tubular reactor has a reactor temperature that does not exceed a maximum temperature of the catalyst, said maximum temperature being about 230° C. to 240° C.

21. The process of claim 1 wherein the cooling fluid has a predetermined coolant temperature in the range of 180° C. to 220° C.

22. The process of claim 1 wherein the cooling fluid has a predetermined coolant temperature in the range of 200° C. to 215° C.

23. The process of claim 1 wherein the gas feedstream has an inlet temperature which is substantially the same as a predetermined coolant temperature of the cooling fluid.

24. The process of claim 1 wherein the gas feedstream has an inlet temperature between 200° C. and 235° C.

25. The process of claim 1 wherein the gas feedstream has an inlet temperature between 200° C. and 230° C.

26. The process of claim 1 wherein the hydrocarbons comprise less than 7% $C_2$–$C_4$ olefins.

* * * * *